(12) United States Patent
Park

(10) Patent No.: US 11,175,015 B1
(45) Date of Patent: Nov. 16, 2021

(54) FLAT LIGHTING APPARATUS AND METHOD FOR MANUFACTURING THE SAME

(71) Applicant: KOLONGLOTECH. Inc, Seoul (KR)

(72) Inventor: Byoung Chul Park, Seosan-si (KR)

(73) Assignee: KOLONGLOTECH, INC, Seoul (KR)

( * ) Notice: Subject to any disclaimer, the term of this patent is extended or adjusted under 35 U.S.C. 154(b) by 0 days.

(21) Appl. No.: 16/950,986

(22) Filed: Nov. 18, 2020

(30) Foreign Application Priority Data

Jul. 7, 2020 (KR) ........................ 10-2020-0083583

(51) Int. Cl.
| | |
|---|---|
| *F21V 7/24* | (2018.01) |
| *F21V 13/04* | (2006.01) |
| *F21K 9/90* | (2016.01) |
| *F21V 8/00* | (2006.01) |
| *F21V 7/04* | (2006.01) |
| *F21Y 115/15* | (2016.01) |

(52) U.S. Cl.
CPC ................ *F21V 13/04* (2013.01); *F21K 9/90* (2013.01); *F21V 7/04* (2013.01); *G02B 6/0051* (2013.01); *G02B 6/0055* (2013.01); *G02B 6/0065* (2013.01); *F21Y 2115/15* (2016.08)

(58) Field of Classification Search
CPC .. G02B 6/0051; G02B 6/0055; G02B 6/0065; F21K 9/90; F21V 13/04
See application file for complete search history.

(56) References Cited

U.S. PATENT DOCUMENTS

| | | | | |
|---|---|---|---|---|
| 5,269,977 A * | 12/1993 | Nakahashi | ............ | B29C 39/006 264/1.1 |
| 7,864,395 B2 * | 1/2011 | Chui | .................... | G02B 6/0041 359/245 |
| 8,049,951 B2 * | 11/2011 | Gruhlke | ................ | G02B 6/0076 359/290 |
| 8,998,475 B2 * | 4/2015 | Yuki | .................... | G02B 6/0038 362/611 |
| 9,285,531 B2 * | 3/2016 | Sherman | ................. | G02B 6/005 |
| 9,952,376 B2 * | 4/2018 | Kim | ......................... | B60Q 3/64 |
| 2005/0146897 A1 * | 7/2005 | Mimura | ............ | G02F 1/133605 362/623 |
| 2011/0122494 A1 * | 5/2011 | Sherman | ................ | G02B 5/128 359/530 |
| 2011/0299013 A1 * | 12/2011 | Ishida | .................. | G02B 6/0038 349/65 |
| 2012/0268687 A1 * | 10/2012 | Kaida | ...................... | B32B 27/08 349/61 |

FOREIGN PATENT DOCUMENTS

| | | |
|---|---|---|
| KR | 1020130045267 | 5/2013 |
| KR | 1020180018586 | 2/2018 |
| KR | 102052908 | 6/2019 |

* cited by examiner

*Primary Examiner* — Arman B Fallahkhair
(74) *Attorney, Agent, or Firm* — Lex IP Meister, PLLC

(57) ABSTRACT

Disclosed herein is a flat lighting apparatus having excellent flexibility and formability to be molded in various shapes as well as excellent optical properties such as brightness. The flat lighting apparatus according to present invention comprises a light guide plate for dispersing light and a reflector formed on a lower portion of the light guide plate to reflect light dispersed by the light guide plate. The reflector has a multi-layered structure including a first layer and a second layer.

14 Claims, 4 Drawing Sheets

FLAT LIGHTING APPARATUS AND METHOD FOR MANUFACTURING THE SAME

TECHNICAL FIELD

The present invention relates to a flat lighting apparatus and a method for manufacturing the same.

BACKGROUND ART

Lighting units used in the field of electronic apparatus have been enhancing optical efficiency employing suitable light sources depending on properties of the electronic apparatus.

Backlight units, as light units used in electronic apparatus, applied to flat panel displays have multi-layered structure fixed by frames. However, these backlight units have a thickness over 5 mm, so that it is impossible to be molded for vehicle.

In addition, the backlight units are formed of poly-methyl-methacrylate (PMMA). But, these backlight units have excellent such as brightness but disadvantages in that they are easily breaking due to rigid properties and have a difficulty in forming 3-dimensional curved surface due to low flexibility.

SUMMARY OF THE INVENTION

It is therefore an object of the present invention to provide a flat lighting apparatus having excellent flexibility and formability to be molded in various shapes as well as excellent optical properties such as brightness.

Embodiments of the present invention provide a flat lighting apparatus comprising a light guide plate for dispersing light, and a reflector formed on a lower portion of the light guide plate to reflect light dispersed by the light guide plate. In this case, the reflector has a multi-layered structure including a first layer and a second layer.

In some embodiments, a pattern is formed on one side of the light guide plate. In some embodiments, the light guide plate is formed of at least one selected from the group consisting of polyethylene, polyethylene terephthalate, polypropylene, polycarbonate, polyvinyl chloride, polyurethane, polyimide, and thermoplastic polyurethane.

In some embodiments, a thickness of the light guide plate is ranged from 200 μm to 650 μm.

In some embodiments, the reflector is plural.

In some embodiments, the reflector is printed on a lower part of the light guide plate.

In some embodiments, the printing is performed by at least one selected from the group consisting of an imprinting, a screen printing, a slot-die, a gravure coating, a T-die or a combination thereof.

In some embodiments, a refractive index of the first layer is different from that of the second layer.

In some embodiments, the refractive index of the first layer is ranged from 1.15 to 1.60, the refractive index of the second layer is ranged from 1.50 to 1.85, and a difference of refractive index of the first and second layers is more than 0.15.

In some embodiments, a thickness of the first and second layers are ranged from 1 μm to 10 μm, respectively.

In some embodiments, the first layer is formed of at least one selected from the group consisting of polyethylene-based resin, acrylic-based resin, urethane-based resin and epoxy-based resin.

In some embodiments, the second layer is formed of at least one selected from the group consisting of polyester-based resin, acrylic-based resin, urethane-based resin and epoxy-based resin.

In some embodiments, the second layer includes light scattering particles.

In some embodiments, the light scattering particles is organic particles, inorganic particles, or a mixture thereof.

In some embodiments, the organic particles are spherical granule having a particle size ranged from 1 μm to 5 μm and a refractive index ranged from 1.4 to 1.6, and the inorganic particles are spherical granule having a particle size ranged from 10 nm to 300 nm and a refractive index ranged from 1.4 to 1.75.

In some embodiments, the organic particles are resin particles including polystyrene-based resin, poly(meth)acrylate-based resin or poly(meth)acrylate random copolymer.

In some embodiments, the inorganic particles are metal oxide particles including silica, aluminum, zirconia or titanium.

Embodiments of the present invention provide a method for manufacturing a flat lighting apparatus comprising printing an optical pattern on a light guide plate, and forming a reflector on a lower portion of the light guide plate. In this case, the forming is repeated more than one time and comprises forming a first layer, and forming a second layer.

In some embodiments, the printing is performed by at least one selected from the group consisting of an imprinting, a screen printing, a stamper or a combination thereof.

In some embodiments, the reflector is formed by at least one selected from the group consisting of an imprinting, a screen printing, a slot-die, a gravure coating, a T-die or a combination thereof.

In some embodiments, the first and second layers are formed by at least one selected from the group consisting of an imprinting, a screen printing, a slot-die, a gravure coating, a T-die or a combination thereof.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION

Figure 1:
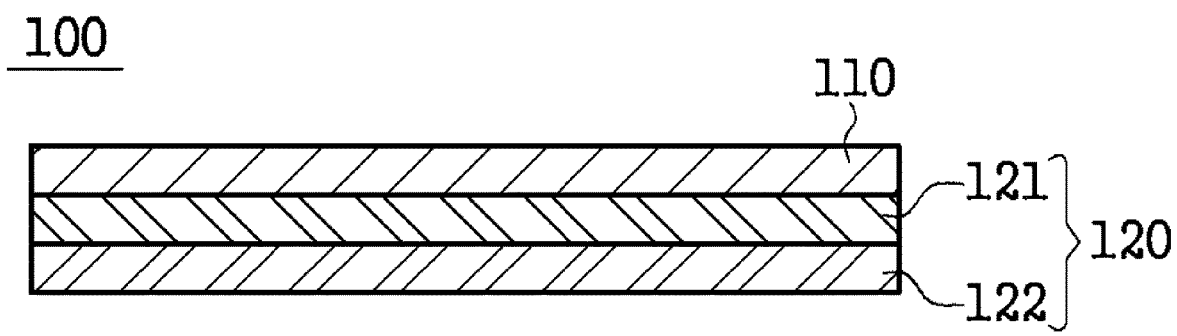
FIG. 1 is a schematic view for showing a flat lighting apparatus according to an embodiment of the present invention.

Hereinafter, the present invention will be described in detail with reference to the drawings. In describing the present invention, detailed descriptions related to publicly known functions or configurations will be omitted in order not to obscure the gist of the present invention.

The present invention may, however, be embodied in different forms and should not be construed as limited to the embodiments set forth herein.

Various modifications to the preferred embodiments will be readily apparent to those skilled in the art and the generic principles herein may be applied to other embodiments. Thus, the present invention is not limited to the embodiment shown but is to be accorded the widest scope consistent with the principles and features described herein.

The present invention may, however, be embodied in different forms and should not be construed as limited to the embodiments set forth herein. The same reference numeral is used to refer to like elements throughout.

In the specification, terms such as "include" or "have" should be understood as designating that features, number, steps, operations, elements, parts, or combinations thereof exist and not as precluding the existence of or the possibility of adding one or more other features, numbers, steps, operations, elements, parts, or combinations thereof in advance.

FIG. 1 is a schematic view for showing a flat lighting apparatus according to an embodiment of the present invention.

Referring to FIG. 1, a flat lighting apparatus 100 according to the present invention comprises a light guide plate for dispersing light 110 and a reflector 120 formed on a lower portion of the light guide plate 110 to reflect light dispersed by the light guide plate 110. The reflector 120 has a multi-layered structure including a first layer 121 and a second layer 122.

Figure 2:
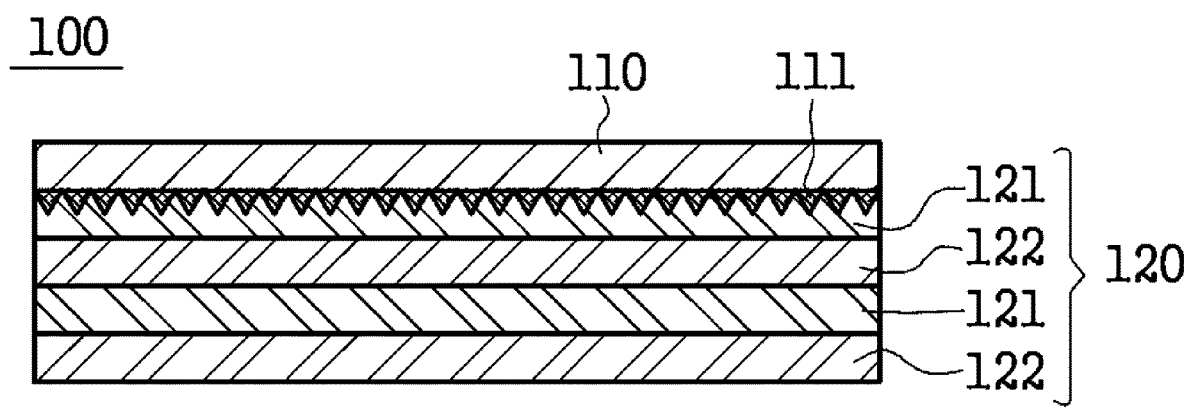
FIG. 2 is a schematic view for showing a flat lighting apparatus in which optical patterns are formed according to an embodiment of the present invention.

FIG. 2 is a schematic view for showing a flat lighting apparatus in which optical patterns are formed according to an embodiment of the present invention.

Referring to FIG. 2, the light guide plate 110 disperse light income from a light source (not shown) therein. An optical pattern 111 is formed on one side of the light guide plate 110, and light guide plate 110 is effectively capable of dispersing light through the optical pattern 111.

The light guide plate 110 is formed of at least one selected from the group consisting of polyethylene, polyethylene terephthalate, polypropylene, polycarbonate, polyvinyl chloride, polyurethane, polyimide, and thermoplastic polyurethane, and preferably, polycarbonate.

In addition, a thickness of the light guide plate 110 is ranged from 200 μm to 650 μm. A the light guide plate 110 is preferably ranged from 200 μm to 500 μm, and more preferably, 200 μm to 400 μm. If the thickness of the light guide plate 110 is less than 200 μm, light income to the light guide plate 110 is not dispersed effectively. If the thickness of the light guide plate 110 exceeds 650 μm, the flexibility of the light guide plate 110 becomes reduced to decline the flexibility of the flat lighting apparatus 100.

Figure 3:
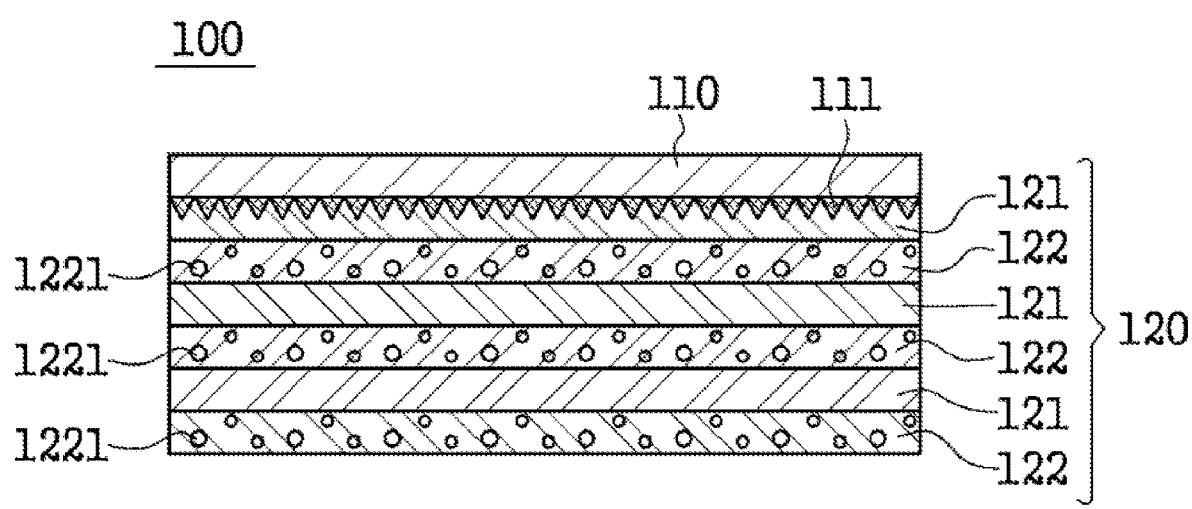
FIG. 3 is a schematic view for showing a flat lighting apparatus in which optical patterns are formed and three reflectors are included according to an embodiment of the present invention.

FIG. 3 is a schematic view for showing a flat lighting apparatus in which optical patterns are formed and three reflectors are included according to an embodiment of the present invention.

Referring to FIG. 3, the reflector 120 is formed on a lower part of the light guide plate 110 to reflect light dispersed by the light guide plate 110 and may be plural on the lower part of the light guide plate 110. Preferably, the reflector 120 may be two to six, and more preferably, two to four.

If the reflector 120 exceeds six, the flexibility of the lighting apparatus 100 is reduced, so that a target curved shape cannot be formed and light transmittance also can be reduced.

The reflector 120 is printed on the lower part of the light guide plate 110 to be formed. The printing is performed by at least one selected from the group consisting of an imprinting, a screen printing, a slot-die, a gravure coating, a T-die or a combination thereof.

The reflector 120 is printed on the lower part of the light guide plate 110 to be capable of reducing a thickness of the lighting apparatus 100, so that the flexibility and formability of the light guide plate 110 can be improved.

The reflector has a multi-layered structure having the first and second layers 121 and 122. The first and second layers 121 and 122 may be formed by printing. The printing is performed by at least one selected from the group consisting of an imprinting, a screen printing, a slot-die, a gravure coating, a T-die or a combination thereof.

The refractive index of the first and second layers 121 and 122 may be different. Due to critical angle variation using this refractive index difference, total internal reflection can be induced, and thereby reflecting light incoming from the light guide plate 110.

The first layer 121 is formed on the lower part of the light guide plate 110. The refractive index of the first layer 121 is ranged from 1.15 to 1.60, and preferably, from 1.30 to 1.50. The refractive index difference between the light guide plate 110 and the first layer 121 may be more than 0.15, and preferably, ranged from 0.20 to 0.35.

If the refractive index of the first layer 121 is less than 1.15 or exceeds 1.60, it may be difficult for light to be reflected. In addition, if the refractive index difference between the light guide layer 100 and the first layer 212 is less than 0.15 or exceeds 0.35, it may be difficult for light to be reflected.

The first layer 121 is formed of at least one selected from the group consisting of polyethylene-based resin, acrylic-based resin, urethane-based resin and epoxy-based resin, and preferably, acrylic-based resin.

The thickness of the first layer 121 is ranged from 1 μm to 10 μm, and preferably, ranged from 2 μm to 8 μm. If the thickness of the first layer 121 is less than 1 μm, it may be difficulty for light to be reflected. If the thickness of the first layer 121 is more than 10 μm, the flexibility of the lighting apparatus 100 is reduced, so that a target curved shape cannot be formed and light transmittance also can be reduced.

The second layer 122 is printed on the lower portion of the first layer 121 and the refractive index thereof is ranged from 1.50 to 1.85, and preferably, from 1.60 to 1.80. In addition, the refractive index difference between the first layer 121 and the second layer 122 may be more than 0.15, and preferably, ranged from 0.20 to 0.35.

If the refractive index of the second layer 122 is less than 1.60 or exceeds 1.80, it may be difficult for light to be reflected. In addition, if the refractive index between the light guide layer 100 and the first layer 212 is less than 0.15 or exceeds 0.35, it may be difficult for light to be reflected.

The second layer 122 is formed of at least one selected from the group consisting of polyester-based resin, acrylic-based resin, urethane-based resin and epoxy-based resin, and preferably, polyester-based resin. The polyester-based resin may be polyethylene terephthalate-based resin.

The thickness of the second layer 122 is ranged from 0.5 μm to 10 μm, and preferably, ranged from 1 μm to 8 μm. If the thickness of the first layer 121 is less than 0.5 μm, it may be difficulty for light to be reflected. If the thickness of the second layer 122 is more than 10 μm, the flexibility of the lighting apparatus 100 is reduced, so that a target curved shape cannot be formed and light transmittance also can be reduced.

The second layer 122 includes light scattering particles 1221, which are organic particles, inorganic particles, or a mixture thereof.

The light scattering particles 1221 perform a function to reflect and diffuse light that guided from the light guide plate 110 to induce total internal reflection of light of the light guide plate 110.

Concretely, the organic particles are spherical granule having a particle size ranged from 1 μm to 5 μm and a refractive index ranged from 1.4 to 1.6, and the inorganic particles are spherical granule having a particle size ranged from 10 nm to 300 nm and a refractive index ranged from 1.4 to 1.75.

If the particle size and refractive index of the organic particles and inorganic particles are out of the above-mentioned range, the reflection efficiency of the light guided from the light guide plate 110 is reduced and light transmittance to next layer is also reduced, so that total reflection efficiency of the light guide plate 110 is reduced.

The organic particles are resin particles including polystyrene-based resin, poly(meth)acrylate-based resin or poly(meth)acrylate random copolymer. The inorganic particles are metal oxide particles including silica, aluminum, zirconia or titanium. The (meth) acryl includes acryl and methacryl, and preferably, $SiO_2$.

The light scattering particles ranged from 0.5 weight % to 5 weight % is included in the second layer 122. If the light scattering particles are out of he these ranges, light transmittance to next layer is reduced so that total reflection efficiency of the light guide plate 110 is reduced.

Figure 4:
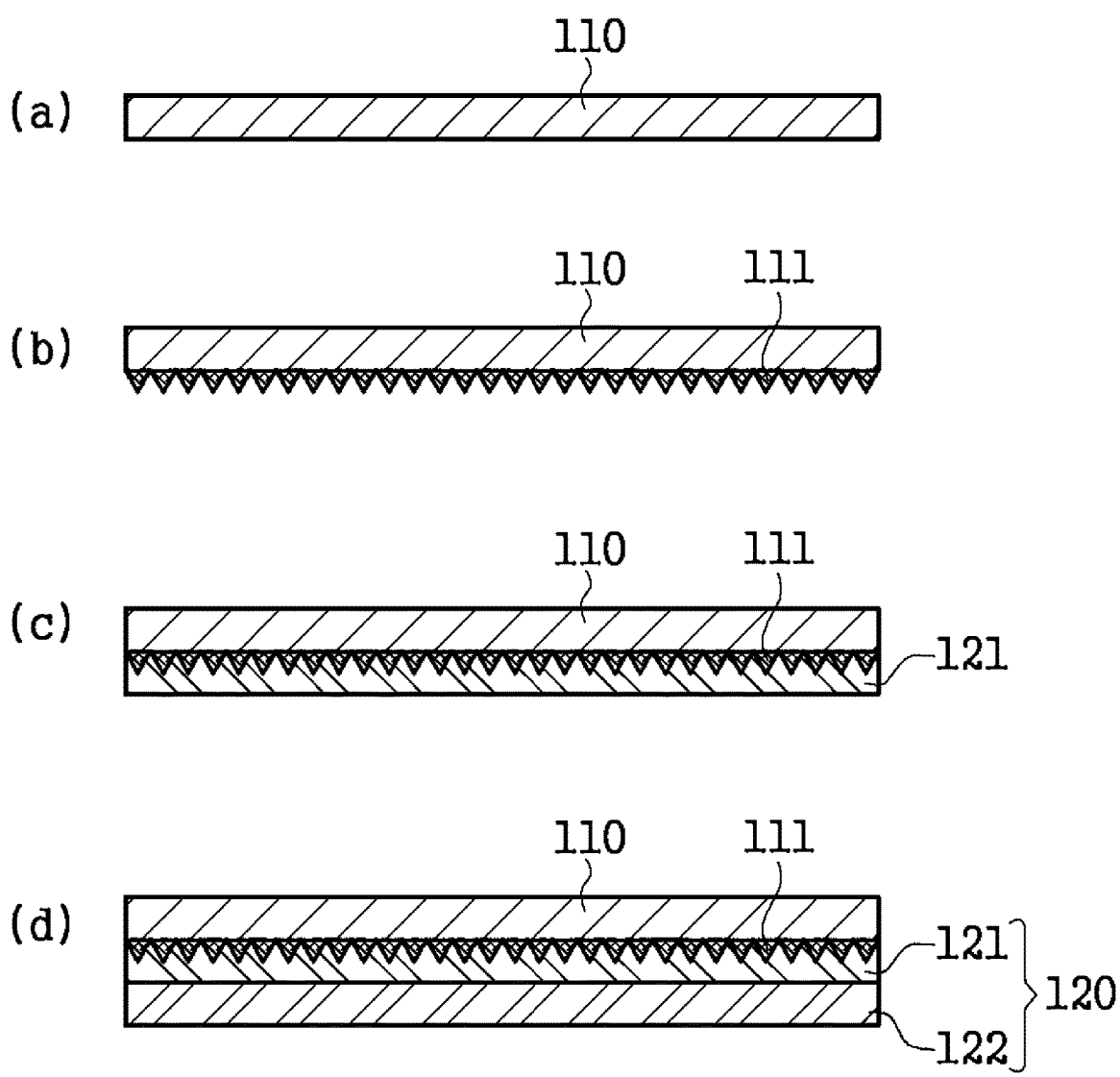
FIG. 4 is a schematic view for illustrating a method for illustrating a flat lighting apparatus according to an embodiment of the present invention.

FIG. 4 is a schematic view for illustrating a method for illustrating a flat lighting apparatus according to an embodiment of the present invention.

Referring to FIG. 4, a method for manufacturing a flat lighting apparatus comprises printing an optical pattern 111 on a light guide plate 110 and forming a reflector 120 on a lower portion of the light guide plate 110. In this case, the forming the reflector 120 is repeated more than one time and comprises forming a first layer 121 and forming a second layer 122.

The optical pattern 111 is printed on the light guide plate 110 in order to diffuse light income from light source therein.

The printing with respect to the optical pattern 111 is performed by at least one selected from the group consisting of an imprinting, a screen printing, a stamper or a combination thereof. The screen printing or imprinting is an embossing-carving type, and the stamper is an engraved-type.

The forming the reflector 120 on the lower portion of the light guide plate 110 is a step for forming one or more reflector 120, which is repeated more than one time.

The reflector 120 is formed by at least one selected from the group consisting of an imprinting, a screen printing, a slot-die, a gravure coating, a T-die or a combination thereof.

The forming the reflector 120 comprises forming a first layer 121 and forming a second layer 122.

In the forming the reflector 120, the first layer 121 is coated on the lower portion of the light guide plate 110, and the second layer 122 is coated on Then, the first layer 121 is coated on a lower portion of the second layer 122, and the second layer 122 is coated on the lower portion of the first layer 121. These steps are repeated to form one or more reflector 120.

The first and second layers 121 and 122 are formed by at least one selected from the group consisting of an imprinting, a screen printing, a slot-die, a gravure coating, a T-die or a combination thereof.

In addition, a drying step after forming the first layer 121 and a drying step after forming the second layer 122 may be added.

The flat lighting apparatus according to the present invention 100 includes a multi-layered reflector 120 formed of materials having different refractive index to improve optical property such as brightness. Additionally, the reflector 120 is printed on the lower portion of the light guide plate 110 to have excellent flexibility and formability.

In addition, the flat lighting apparatus according to the present invention 100 can be variously formed with curved surface through a hot pressing molding method. For example, the flat lighting apparatus 100 is installed in vehicles to be used as sensitive lightings. Furthermore, the flat lighting apparatus 100 is used as sunshade boards, door trims, front, central, and rear pillars, I/P panels, consoles, garnishes, roll blinds, and so forth.

The hot pressing molding method is a manner in which a mold (not shown) is fixed to one side of the flat lighting apparatus 100 and then heat and pressure are applied thereto. Depending on a mold figure, the flat lighting apparatus 100 with curved surfaces or 3-dimensional shape can be manufactured.

Concretely, the hot pressing molding method is performed under condition that a temperature is ranged from 140° C. to 180° C., a pressure is ranged from 0.30 Mpa to 10 Mpa, and a molding time is ranged from 0.5 minutes to 30 minutes.

Hereinafter, concrete examples in accordance with the present invention will be described in more detail.

PREPARATION EXAMPLE

Three reflectors were manufactured by the following methods.

Polyethylene resin having a refractive index of 1.38 was imprinted on a releasable to have a thickness of 5 μm to form a first layer, and then the first layer was dried through UV irradiation. A second layer was formed by mixing $SiO_2$ of 3 weight % having a refractive index of 1.46 and imprinting polyethylene terephthalate resin having a refractive index of 1.67 on a lower portion of the first layer to have a thickness of 2 μm. Then, the second layer was dried through UV irradiation (First reflector). The polyethylene resin was imprinted on a lower portion of the second layer to have a thickness of 3 μm to form a first layer, and the first layer was dried through UV irradiation. The polyethylene terephthalate resin was imprinted on the lower portion of the first layer to have a thickness of 2 μm to form a second layer, and the second layer was dried (Second reflector). The polyethylene resin was imprinted on the lower portion of the second layer to have a thickness of 3 μm to form a first layer, and the first layer was dried through UV irradiation. The polyethylene terephthalate resin was imprinted on the lower portion of the first layer to have a thickness of 2 μm to form a second layer, and the second layer was dried (Third reflector). After that, three reflectors were manufactured by removing the plate.

Comparative Preparation Example 1

A first layer was formed by mixing $SiO_2$ of 3 weight % having a refractive index of 1.46 and imprinting polyethylene terephthalate resin having a refractive index of 1.67 on a lower portion of the first layer to have a thickness of 5 μm on a releasable plate, and the first layer was dried. A second layer was formed by imprinting polyethylene resin having a refractive index of 1.38 on a lower portion of the first layer to have a thickness of 2 μm (First reflector). The polyethylene terephthalate resin was imprinted on a lower portion of the second layer to have a thickness of 3 μm to form a first layer. The polyethylene resin was imprinted on the lower portion of the first layer to have a thickness of 2 μm to form a second layer (Second reflector). The polyethylene terephthalate resin was imprinted on the lower portion of the second layer to have a thickness of 3 μm to form a first layer. The polyethylene resin was imprinted on the lower portion of the first layer to have a thickness of 2 μm to form a second layer (Third reflector). Then, three reflectors were manufactured by removing the plate.

Comparative Preparation Example 2

A polyethylene terephthalate film having a thickness of 50 μm was manufactured.

Example 1

A flat lighting apparatus was manufactured by the following method.

An optical pattern was printed by a screen printing method, and a polyethylene resin having a refractive index of 1.38 was imprinted to have a thickness of 5 μm on a lower portion of a light guide plate which formed of polycarbonate film and has a thickness of 250 μm, so that a first layer was formed. Then, the first layer was dried through UV irradiation. A second layer was formed by mixing $SiO_2$ of 3 weight % having a refractive index of 1.46 and imprinting polyethylene terephthalate resin having a refractive index of 1.67 on a lower portion of the first layer to have a thickness of 2 μm. Then, the second layer was dried through UV irradiation (First reflector). The polyethylene resin was imprinted on a lower portion of the second layer of the first reflector to have a thickness of 3 μm to form a first layer, and the first layer was dried through UV irradiation. A second layer was formed by mixing $SiO_2$ of 3 weight % having a refractive index of 1.46 and by imprinting polyethylene terephthalate resin having a refractive index of 1.67 on the lower portion of the first layer to have a thickness of 2 μm, and the second layer was dried through UV irradiation (Second reflector). The polyethylene resin was imprinted on the lower portion of the second layer of the second reflector to have a thickness of 3 μm to form a first layer, and the first layer was dried through UV irradiation. A second layer was formed by mixing $SiO_2$ of 3 weight % having a refractive index of 1.46 and by imprinting polyethylene terephthalate resin having a refractive index of 1.67 on the lower portion of the first layer to have a thickness of 2 μm, and the second layer was dried through UV irradiation (Third reflector).

Example 2

A flat lighting apparatus was manufactured by the following method.

An optical pattern was printed by a screen printing method, $SiO_2$ of 3 weight % having a refractive index of 1.46 was mixed, and polyethylene terephthalate resin having a refractive index of 1.67 was imprinted to have a thickness of 5 μm on a lower portion of a light guide plate which formed of polycarbonate film and has a thickness of 250 μm, so that a first layer was formed. Then, the first layer was dried through UV irradiation. A second layer was formed by imprinting polyethylene resin having a refractive index of 1.38 on a lower portion of the first layer to have a thickness of 2 μm (First reflector). A first layer was formed by mixing $SiO_2$ of 3 weight % having a refractive index of 1.46 and imprinting polyethylene terephthalate resin having a refractive index of 1.67 to have a thickness of 3 μm on a lower portion of the second layer of the first reflector. A second layer was formed by imprinting the polyethylene resin to have a thickness of 2 μm on the lower portion of the first layer (Second reflector). A second layer was formed by mixing $SiO_2$ of 3 weight % having a refractive index of 1.46 and imprinting polyethylene terephthalate resin having a refractive index of 1.67 to have a thickness of 3 μm on a lower portion of the second layer of the second reflector. A second layer was formed by imprinting the polyethylene resin to have a thickness of 2 μm on the lower portion of the first layer (Third reflector).

Example 3

A flat lighting apparatus was manufactured in the same manner as in Example 1, except that fourth to sixth reflectors were formed on a lower portion of the third reflector by the following method. Polyethylene resin having a thickness of 3 μm was imprinted on a lower portion of the second layer of the third reflector to form a first layer, and the first layer was dried through UV irradiation. A second layer was formed by mixing $SiO_2$ of 3 weight % having a refractive index of 1.46 and imprinting polyethylene terephthalate resin having a refractive index of 1.67 to have a thickness of 2 μm on a lower portion of the first reflector (Fourth reflector). The polyethylene resin was imprinted to have a thickness of 3 μm on a lower portion of the second layer of the fourth reflector to form a first layer. A second layer was formed by mixing $SiO_2$ of 3 weight % having a refractive index of 1.46 and imprinting polyethylene terephthalate resin having a refractive index of 1.67 to have a thickness of 2 μm on a lower portion of the first reflector (Fifth reflector). The polyethylene resin was imprinted to have a thickness of 3 μm on a lower portion of the second layer of the firth reflector to form a first layer. A second layer was formed by mixing $SiO_2$ of 3 weight % having a refractive index of 1.46 and imprinting polyethylene terephthalate resin having a refractive index of 1.67 to have a thickness of 2 μm on the lower portion of the first reflector (Sixth reflector)

Comparative Example 1

An optical pattern was printed by a screen printing method, and a light guide plate was manufactured by polycarbonate with a thickness of 250 μm.

Comparative Example 2

A flat lighting apparatus was manufactured by the following method.

An optical pattern was printed by a screen printing method, and a flat lighting apparatus, in which polyethylene terephthalate having a thickness of 50 μm was adhered through a light-transmitting adhesive layer on a lower portion of a light guide plate formed of polycarbonate with a thickness of 250 μm, was manufactured. The 50 μm-HSV0101NP product manufactured by Sekisui company was used as the light-transmitting adhesive layer.

Experimental Example 1

The reflection ratio and haze of the reflectors manufactured in the preparation example and comparative preparation examples 1 and 2 were measured by the following experimental tests, and the results were shown in the following table 1.

[Test Method]
Reflectance measured according to ISO 2470.

TABLE 1

| Classification | Reflection Ratio | | |
| --- | --- | --- | --- |
| | Total reflection ratio (%) | Diffused reflection ratio (%) | Specular reflection ratio (%) |
| Preparation Example | 80.76 | 77.03 | 3.73 |
| Comparative Preparation Example | 79.33 | 76.35 | 2.98 |
| Comparative Preparation Example | 97.03 | 88.35 | 8.68 |

Referring to the above table 1, comparing the reflector in the preparation example constituted with first and second layers having different refractive index with the film formed of polycarbonate in the comparative preparation example 2, we found that there was little difference of total internal reflection ratio, diffused reflection ratio, and specular reflection ratio, so that the reflector had excellent function.

Experimental Example 2

The average picture level, heat resistance, environmental durability, and formability of the flat lighting apparatus manufactured in the examples 1 to 3 and comparative examples 1 and 2 were measured by the following experimental tests, and the results were shown in the following table 2.

[Test Method]
Average picture level measured by luminance meter (BM-7) manufactured by TOPCON company in Japan.

Heat resistance was measured by whether bubbling and peeling is or not under condition that the flat lighting apparatus left for 300 hours at 85° C. in hot air oven.

Environmental durability measured by naked-eye under condition that the flat lighting apparatus left for 300 hours at a temperature of 85° C. and a humidity of 85%.

Formability measured by naked-eye after the flat lighting apparatus was pre-heated for 300 hours at an ambient temperature of 190° C. and a hot press was performed for 1 minutes at a pressure of 10 kpa with respect to an up and down mold of 40° C.

TABLE 2

| Classification | Average Picture Level (cd/m$^2$) | Heat Resistance | Environmental Durability | Formability |
| --- | --- | --- | --- | --- |
| Example 1 | 83 | Good | Good | Good |
| Example 2 | 56 | Good | Good | Good |
| Example 3 | 85 | Lifting, peeling, and bubbling | Lifting, peeling, and bubbling | Lifting, peeling, and bubbling |

TABLE 2-continued

| Classification | Average Picture Level (cd/m$^2$) | Heat Resistance | Environmental Durability | Formability |
| --- | --- | --- | --- | --- |
| Example 1 | 23 | Good | Good | Good |
| Example 2 | 90 | Lifting, peeling, and bubbling | Lifting, peeling, and bubbling | Lifting, peeling, and bubbling |

Referring to the above table 2, comparing the flat lighting apparatus constituted with three reflectors in the examples 1 and 2 with the flat lighting apparatus constituted with the PET reflector in the comparative example 2, we found that optical property such as brightness was equaled, and at the same time, the durability, environmental durability, and formability were very excellent.

The flat lighting apparatus constituted with six reflectors in the example 3 had excellent brightness but the heat resistance thereof was reduced as compared with the flat lighting apparatus constituted with three reflectors in the example 1.

In addition, the flat lighting apparatus without reflector in the comparative example 1 had excellent heat resistance but very low brightness.

Furthermore, the flat lighting apparatus with the reflector in which the refractive index of the first layer thereof was low in the example 1 had much more excellent brightness rather than vice versa (see example 2).

According to an embodiment of the present invention, the flat lighting apparatus has a reflector having a multi-layered structure to have excellent optical property such as brightness In addition, the reflector is printed on the lower part of the light guide plate to have excellent flexibility and formability.

Furthermore, the multi-layered reflector is formed of materials having different refractive index to improve optical property such as brightness.

All such changes, modifications, variations and other uses and applications which do not depart from the spirit and scope of the invention are deemed to be covered by the invention which is limited only by the claims which follow.

What is claimed is:

1. A flat lighting apparatus comprising: a light guide plate for dispersing light; and a reflector formed on a lower portion of the light guide plate to reflect light dispersed by the light guide plate, wherein the reflector has a multi-layered structure including a first layer formed of at least one selected from the group consisting of polyethylene-based resin, acrylic-based resin, urethane-based resin and epoxy-based resin and a second layer formed of at least one selected from the group consisting of polyester-based resin, acrylic-based resin, urethane-based resin and epoxy-based resin, wherein a refractive index of the first layer is different from a refractive index of the second layer; wherein a difference of the refractive indices of the first and second layers is more than 0.15 and less than 0.7.

2. The flat lighting apparatus of claim 1, wherein the second layer includes light scattering particles.

3. The flat lighting apparatus of claim 2, wherein the light scattering particles is organic particles, inorganic particles, or a mixture thereof.

4. The flat lighting apparatus of claim 3, wherein the organic particles are spherical granule having a particle size ranged from 1 μm to 5 μm and a refractive index ranged from 1.4 to 1.6, and the inorganic particles are spherical granule having a particle size ranged from 10 μm to 300 μm and a refractive index ranged from 1.4 to 1.75.

5. The flat lighting apparatus of claim 3, wherein the organic particles are resin particles including polystyrene-based resin, poly(meth)acrylate-based resin or poly(meth)acrylate random copolymer.

6. The flat lighting apparatus of claim 3, wherein the inorganic particles are metal oxide particles including silica, aluminum, zirconia or titanium.

7. The flat lighting apparatus of claim 1, wherein the reflector is printed on a lower part of the light guide plate.

8. The flat lighting apparatus of claim 7, wherein the printing is performed by at least one selected from the group consisting of an imprinting, a screen printing, a slot-die, a gravure coating, a T-die or a combination thereof.

9. The flat lighting apparatus of claim 1, wherein a pattern is formed on one side of the light guide plate.

10. The flat lighting apparatus of claim 1, wherein the light guide plate is formed of at least one selected from the group consisting of polyethylene, polyethylene terephthalate, polypropylene, polycarbonate, polyvinyl chloride, polyurethane, polyimide, and thermoplastic polyurethane.

11. The flat lighting apparatus of claim 1, wherein a thickness of the light guide plate is ranged from 200 μm to 650 μm.

12. The flat lighting apparatus of claim 1, wherein the reflector includes pluralities of the multi-layered structures plural.

13. The flat lighting apparatus of claim 1, wherein the refractive index of the first layer is ranged from 1.15 to 1.60, the refractive index of the second layer is ranged from 1.50 to 1.85.

14. The flat lighting apparatus of claim 1, wherein a thickness of the first and second layers are ranged from 1 μm to 10 μm, respectively.

* * * * *